United States Patent
Needham et al.

(10) Patent No.: US 9,609,802 B2
(45) Date of Patent: Apr. 4, 2017

(54) ASSEMBLY FOR ANGLE ADJUSTMENT

(71) Applicant: Needham Ag Technologies, LLC, Calhoun, KY (US)

(72) Inventors: Philip Needham, Calhoun, KY (US); Benjamin Needham, Calhoun, KY (US)

(*) Notice: Subject to any disclaimer, the term of this patent is extended or adjusted under 35 U.S.C. 154(b) by 0 days.

(21) Appl. No.: 14/738,133

(22) Filed: Jun. 12, 2015

(65) Prior Publication Data
US 2015/0359162 A1 Dec. 17, 2015

Related U.S. Application Data

(60) Provisional application No. 62/011,214, filed on Jun. 12, 2014.

(51) Int. Cl.
*A01C 5/06* (2006.01)

(52) U.S. Cl.
CPC ................... *A01C 5/068* (2013.01)

(58) Field of Classification Search
CPC ......... A01B 35/28; A01B 35/16; A01B 71/02; A01C 5/064; A01C 5/068; A01C 5/06; A01C 5/066; A01C 7/205; A01C 7/006; A01C 7/201; A01C 7/203
USPC ......... 111/62, 164, 167, 194, 195, 192, 137; 172/1, 538
See application file for complete search history.

(56) References Cited

U.S. PATENT DOCUMENTS

| | | | |
|---|---|---|---|
| 4,404,918 A * | 9/1983 | Whalen | A01C 5/068 111/137 |
| 6,314,897 B1 * | 11/2001 | Hagny | A01C 7/006 111/192 |
| 6,578,502 B1 * | 6/2003 | Barnstable | A01B 35/16 111/164 |
| 7,472,447 B2 * | 1/2009 | Lougheed | A46B 5/0075 15/144.1 |
| 8,863,857 B2 * | 10/2014 | Bassett | A01C 5/06 111/136 |
| 9,320,191 B2 * | 4/2016 | Patwardhan | A01C 5/066 |

FOREIGN PATENT DOCUMENTS

WO  2013101816 A  7/2013

OTHER PUBLICATIONS

Case 500 Opener Assy; Case IH.
Exapta Solutions _The Thompson closing wheel and bracket for CIH Precision-500 drills.
Grain Drill Closing Wheel Assembly.
Series 25 MRB Parts Book, MRB Closer Wheel Assembly; Case IH.

* cited by examiner

*Primary Examiner* — Robert Pezzuto
(74) *Attorney, Agent, or Firm* — Hamilton IP Law, PC; Jay R. Hamilton; Charles A. Damschen

(57) ABSTRACT

An assembly for angle adjustment may be used with agriculture equipment such as planters, applicators and tillage equipment wherein deployment of a coupler upon a shaft to allow introduction of an angle is beneficial. A closing wheel assembly incorporating the assembly for angle adjustment allows control of the angle of a closing wheel to improve soil gathering action for delivery of more or less soil to the seed slot/open furrow generated by the opener or opener assembly of a planter (drill) row unit. Exemplary applications of the assembly for angle adjustment include row unit closing wheel assemblies, fertilizer applicators and strip tillage closing systems.

20 Claims, 13 Drawing Sheets

ASSEMBLY FOR ANGLE ADJUSTMENT

CROSS-REFERENCE TO RELATED APPLICATIONS

Applicant states that this non-provisional patent application claims priority under 35 U.S.C. 119(e) from provisional U.S. Pat. App. No. 62/011,214 filed on Jun. 12, 2014, which is incorporated by reference herein in its entirety.

FIELD OF THE INVENTION

The methods and apparatuses described herein are generally applicable to the field of agricultural equipment. The embodiments shown and described herein are more particularly designed for improving assemblies benefitting from inclusion of an angle and adjustability therein. As discussed in detailed, the concept may be applied to many embodiments and designs allowing for improved performance in varying soil types and soil moisture conditions including closing wheel assemblies, fertilizer applicators, strip tillage closing systems and other farm equipment.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable.

AUTHORIZATION PURSUANT TO 37 C.F.R. §1.71 (d)

A portion of the disclosure of this patent document contains material which is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

SUMMARY OF REFERENCES

1. U.S. Pat. No. 4,404,918 Closing Wheel Mounting for a Planter
2. U.S. Pat. No. 5,957,219 Agricultural adjustable closing tool for use with a cutting implement
3. U.S. Pat. No. 6,216,616 Mid Row Banding Coulter Drill
4. U.S. Pat. No. 7,814,847 Seed boot for double-shoot disc opener
5. U.S. Pat. No. 8,359,987 Depth Adjustment Assembly for a Disc Opener of an Agricultural Implement The preceding list of references provides useful background for the present disclosure and is incorporated by reference herein. The incorporation of the preceding list of references and the teaching of each reference therein is not an admission by the Applicant as to relevancy of the references as prior art.

SUMMARY OF INVENTION

An assembly for angle adjustment is disclosed and shown for use with agriculture equipment such as planters, applicators and tillage equipment wherein deployment of a coupler upon a shaft to allow introduction of an angle is beneficial. Without restriction or limitation, exemplary applications include row unit closing wheel assemblies, fertilizer applicators and strip tillage closing systems.

In one embodiment, a closing wheel assembly to adjust the angle of a closing wheel relative to the seed slot (furrow) opening is disclosed herein and illustrated herein. In one illustrative application, the closing wheel assembly may be retrofitted to existing drill, planter or air-seeder closing wheel arms. As disclosed and claimed herein, the closing wheel arm modification allows adjustment or change in the gathering action (side angle relative to the direction of travel) and caster angle (left/right tilting action, relative to the direction of travel). This is beneficial to users as soil types and conditions may change from day to day, from farm to farm, and or region to region. Adjustment of the angle of the closing wheel may be accomplished simply by rotating the outer coupler as shown in the enclosed figures. The range of adjustment is up to 12 degrees as necessitated by various soil and field conditions. As disclosed, the closing wheel adjusting assembly may be used with paired closing wheels, wherein each planter row unit includes two closing wheels, or it may be used with single closing wheels, wherein each planter row unit includes one closing wheel, as shown in the figures.

BRIEF DESCRIPTION OF FIGURES

In order that the advantages of the assembly for angle adjustment will be readily understood, a more particular description of the closing wheel briefly described above will be rendered by reference to specific embodiments illustrated in the appended drawings. Understanding that these drawings depict only typical embodiments of the assembly for angle adjustment as deployed for a row unit closing wheel and are not therefore to be considered limited of its scope, the closing wheel will be described and explained with additional specificity and detail through the use of the accompanying drawings.

Figure 1:
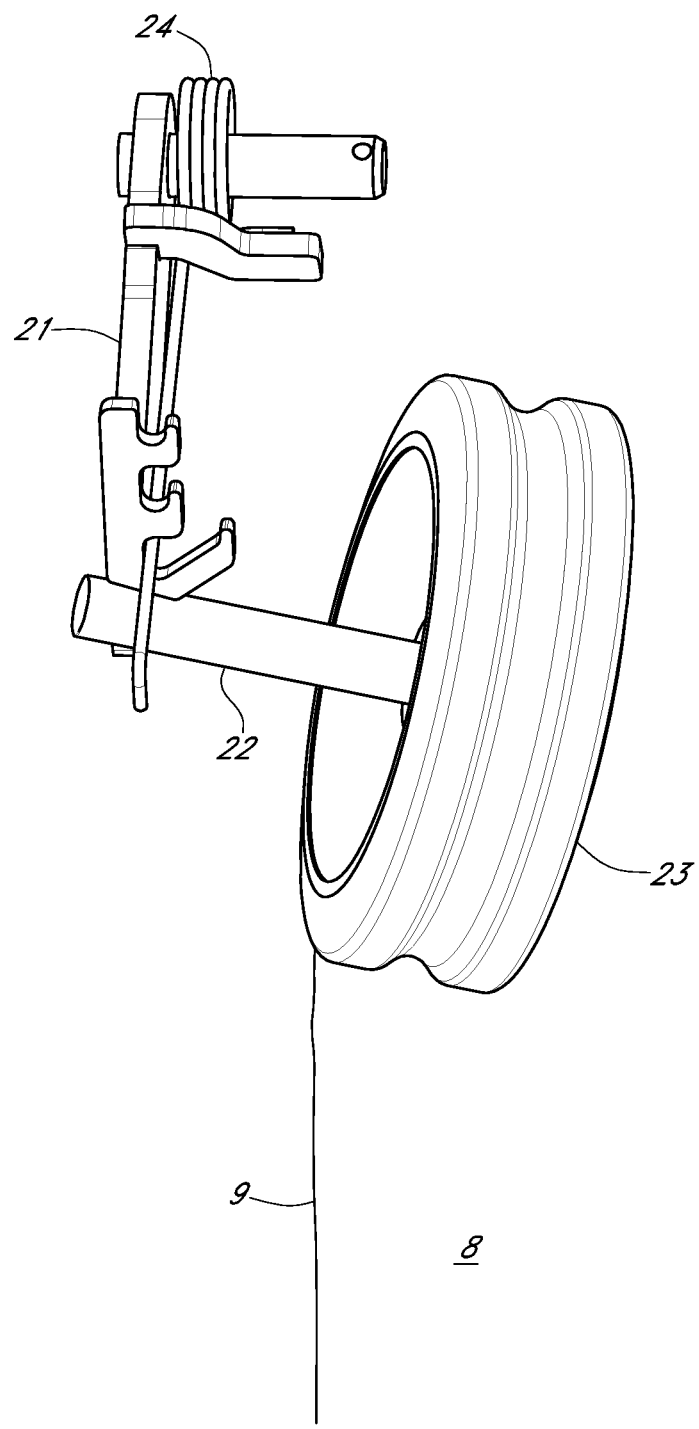
FIG. 1 provides a top view of the closing wheel assemblies as found on as an air-seeder type drill as is well known in the prior art.

The Appendix provides several figures as referenced and included herein to illustrate an air-seeder of the prior art upon which the assembly for angle adjustment of the present disclosure may be mounted for use with a closing wheel assembly.

DETAILED DESCRIPTION

Listing of Elements

| Element Description | Element Number |
| --- | --- |
| Air-Seeder (also known as a drill or planter) | 1 |
| Wheels | 2 |
| Hitch (shown in Appendix) | 3 |
| Tool bar | 4 |
| Linkage (shown in Appendix) | 5 |
| Seed Hopper (shown in Appendix) | 6 |
|  | 7 |
| Ground surface | 8 |
| Furrow/Seed Slot | 9 |
| Soil | 10 |
| Soil direction | 10a |
| Row unit | 11 |
| Row unit frame (shown in Appendix) | 12 |
| Seed delivery mechanism (tube) | 13 |
| Opener assembly | 14 |
| Opener assembly closing wheel assembly receiver | 14a |
| Opener (disc) | 15 |
| Opener assembly arms (upper/lower) | 16 a/b |
| Opener assembly spring (down pressure) | 17 |
| Depth regulator | 18 |
| Cotter pin | 19 |
| Clevis pin | 19a |
| Closing wheel assembly | 20 |
| Closing wheel arm | 21 |
| Closing wheel arm post | 21a |
| Closing wheel shaft | 22 |
| Closing wheel shaft - mating threads | 22a |
| Closing Wheel | 23 |
| Angle | 23a |
| Closing wheel torsion spring | 24 |
| Closing wheel torsion spring rack | 25 |
| Closing wheel arm locking pin | 26 |
| Closing wheel shaft bolt | 27 |
|  | 28 |
|  | 29 |
| Assembly for angle adjustment | 30 |
| Coupler | 31 |
| Coupler - shaft end (receiver) | 31a |
| Coupler - adjustment end | 31b |
| Tapped (Timed) hole for set screw | 32 |
| Bolt | 33 |
| Bolt - shaft end | 33a |
| Bolt - angled end | 33b |
| Bolt - indexing barrel | 33c |
| Set screw | 34 |
| Indicator marks | 35 |

-continued

| Element Description | Element Number |
| --- | --- |
| D-Hole (passage) | 36 |
| D-Hole face | 36a |
| D-Hole indexing edge | 36b |
| D-Hole non-indexing edge | 36c |
| Bore | 37 |
| End nut | 38 |
| Annular groove | 39 |
| O-ring | 40 |

DETAILED DESCRIPTION

Before the present closing wheel adjusting assembly is disclosed and described, it is to be understood that the assembly for angle adjustment 30 is not limited to specific methods, specific components, or to particular implementations. It is also to be understood that the terminology used herein is for the purpose of describing particular embodiments only and is not intended to be limiting. Also, it is to be understood that phraseology and terminology used herein with reference to device or element orientation (such as, for example, terms like "front", "back", "up", "down", "top", "bottom", and the like) are only used to simplify description of the present closing wheel adjusting assembly, and do not alone indicate or imply that the device or element referred to must have a particular orientation. In addition, terms such as "first", "second", and "third" are used herein and in the appended claims for purposes of description and are not intended to indicate or imply relative importance or significance.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed closing wheel adjusting assembly. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all closing wheel adjusting assembly. This applies to all aspects of this application including, but not limited to, components of an assembly for angle adjustment 30. Thus, if there are a variety of additional components that can be added it is understood that each of these additional components can be added with any specific embodiment or combination of embodiments of the disclosed assembly for angle adjustment 30.

Referring now to the drawings, wherein like reference numerals designate identical or corresponding parts throughout the several views, FIG. 1 is a top view of a closing wheel assembly 20 of the prior art which may be mounted upon a row unit 11 (not shown) of a planter, drill or air-seeder 1. One of ordinary skill will appreciate that a planter, drill or air-seeder 1 of the prior art upon which the closing wheel assembly 20 of the present disclosure may be mounted are well known. As shown in Appendix A, the air-seeder 1 is similar to a model built and sold by Case-IH, which is also branded and sold as New-Holland. The general design is similar to many models on the market upon which the assembly for angle adjustment 30 may be applied to allow introduction and control of an angle of the closing wheels 23. Planter row units 11 of the type depicted in FIG. 8 and Appendix A are generally mounted to a tool bar 4 or similar structure using linkage 5 and may be oriented in either a parallel or non-parallel arrangement. The planter row unit 11 generally includes an opener assembly 14 to open a furrow in the ground surface (shown as disc 15), a down pressure member (shown as a spring 17) for applying a biasing force to the opener assembly 14, a depth regulator 18 for regulating the depth of the furrow, a seed delivery mechanism 13 for delivering seed to the opened furrow (shown as a hose), a closing wheel assembly 20 for closing the furrow, at least one hopper 6 for holding seed, and a row unit frame 12 to which various elements of the planter row unit 11 are mounted. (See Appendix A for linkage 5, hopper 6, and row unit frame 12)

Figure 2:
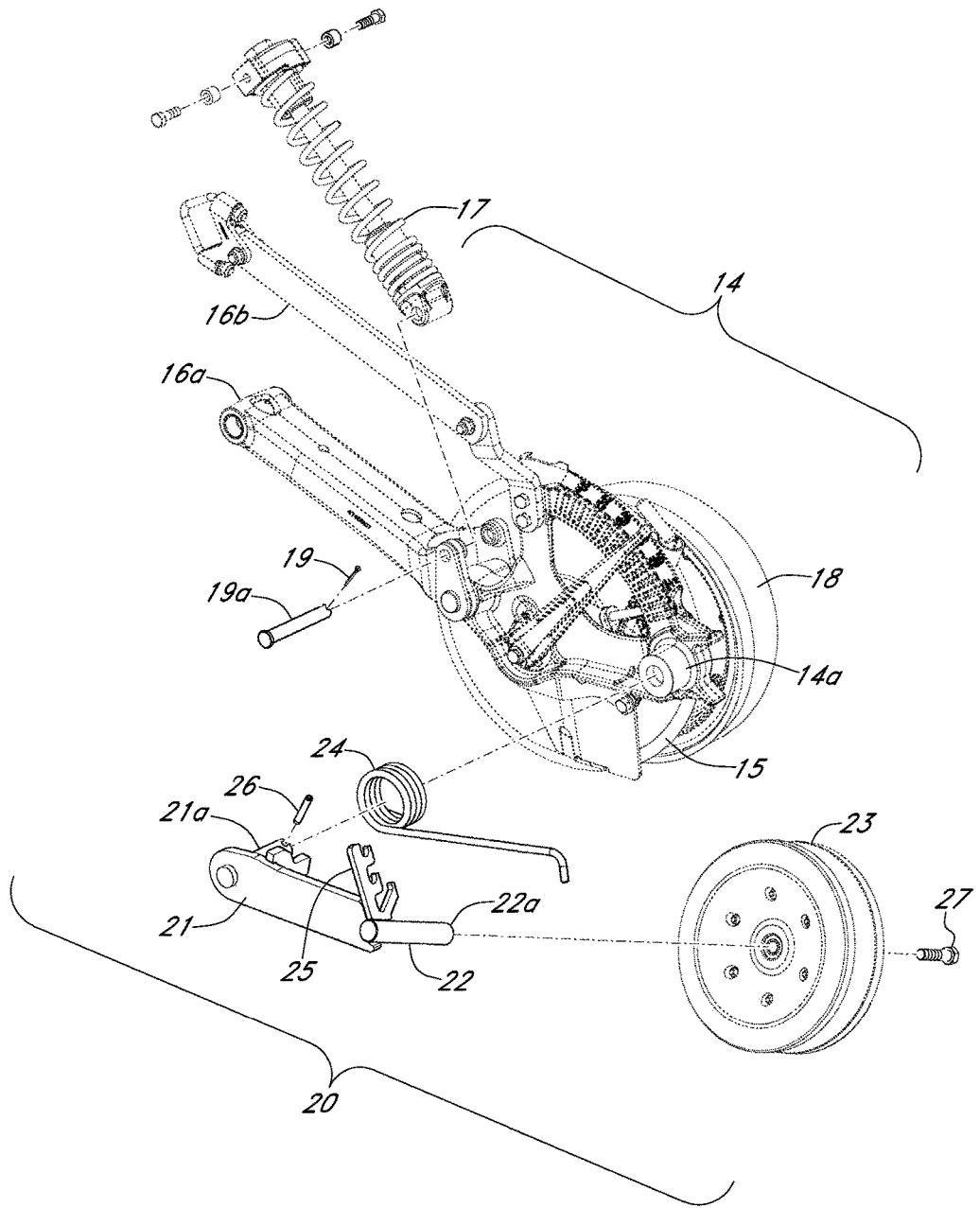
FIG. 2 provides an exploded view of the prior art opener assembly and closing wheel assembly of a row unit as would be mounted to the row unit frame and tool bar of an air-seeder as further disclosed in the Appendix herein.

As shown, FIG. 2 illustrates a detailed view of the closing wheel assembly 20 of one particular air-seeder row unit 11, particularly the opener (disc) 15 and closing wheel 23. The model shown is a row unit offered by CNH and marketed as a Case-IH 500/500T and by New Holland as a 2080/2085. As those practiced in the art will appreciate, the closing wheel assembly 20 shown in FIGS. 1-2 allows the closing wheel 23 to raise or lower, relative to the air-seeder row unit and row unit opener, to allow the closing wheel 23 to follow the soil surface. The closing wheel assembly 20 shown herein includes a closing wheel torsion spring 24 and closing wheel torsion spring rack 25 that function to adjust the pressure upon the closing wheel 23 and thus the amount of soil compression and the potential soil engaging depth of the closing wheel 23. Typically, increasing pressure upon the closing wheel 23 increases the scraping action of the closing wheel 23 on the ground surface 8 thereby increasing the dirt or soil moved during planting for delivery to the open furrow 9 to improve closing of the furrow. (See also FIG. 9 and Appendix along with discussion herein)

Applicant has studied the prior art closing wheel assembly 20 as depicted by FIGS. 1-2 and ascertained that in operation the preferred and beneficial amount of soil is many times not delivered to the furrow 9 opened by row unit opener 15 resulting in poor closing of the furrow, poor soil to seed contact and generally poor conditions for germination and growth of seeds. The closing wheels 23 and closing wheel assembly 20 as pictured in FIGS. 1 and 2 are an illustrative example of a configuration in which the closing wheel 23 when operated across a field does not have enough "soil gathering action" to effectively close the furrow/seed slot, particularly in moist field and soil conditions.

Figure 6A:
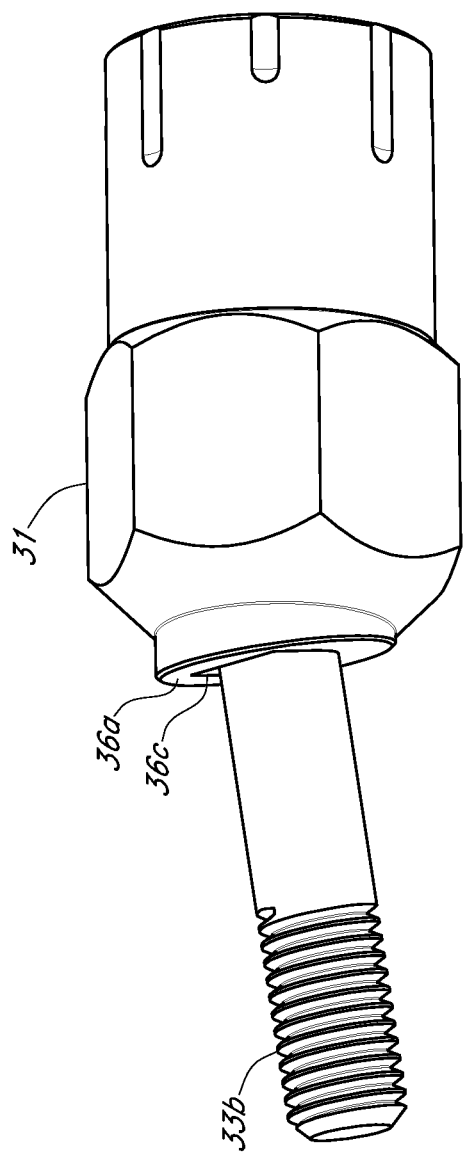
FIG. 6A is a side view of the face of the coupler with the angled bolt positioned therein.
Figure 6B:
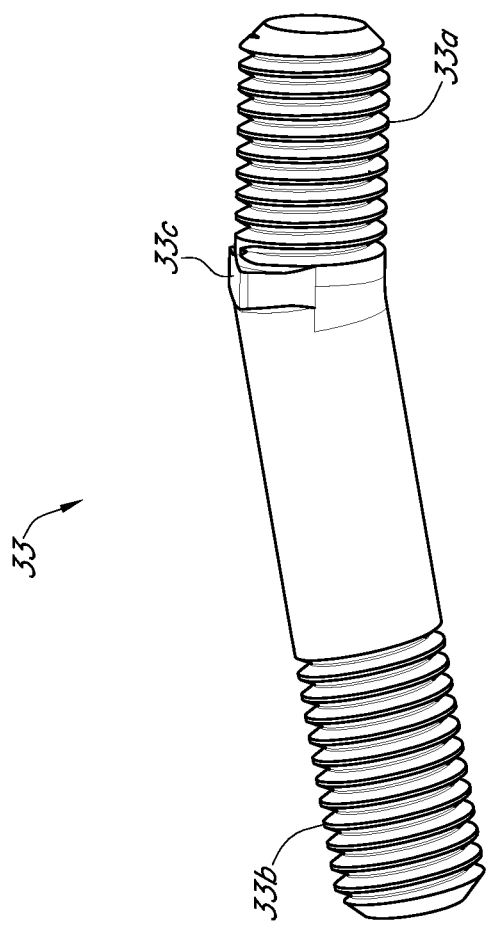
FIG. 6B is a side of the angled bolt illustrating the shoulder and angled nature.
Figure 6C:
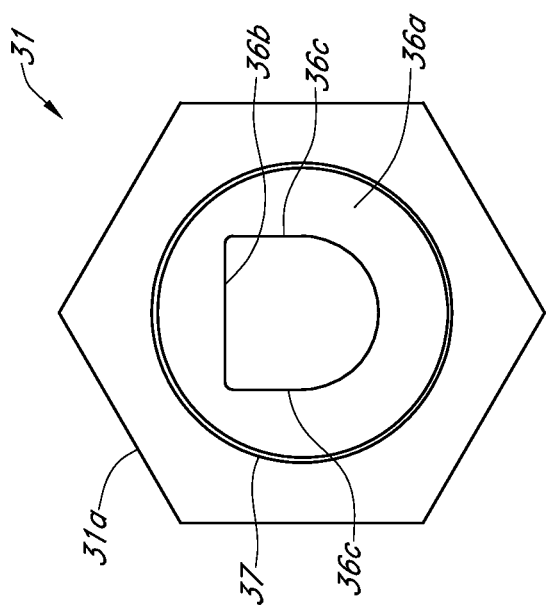
FIG. 6C is a front view of the face of the D-Hole with concentric bore positioned in the coupler.
Figure 6D:
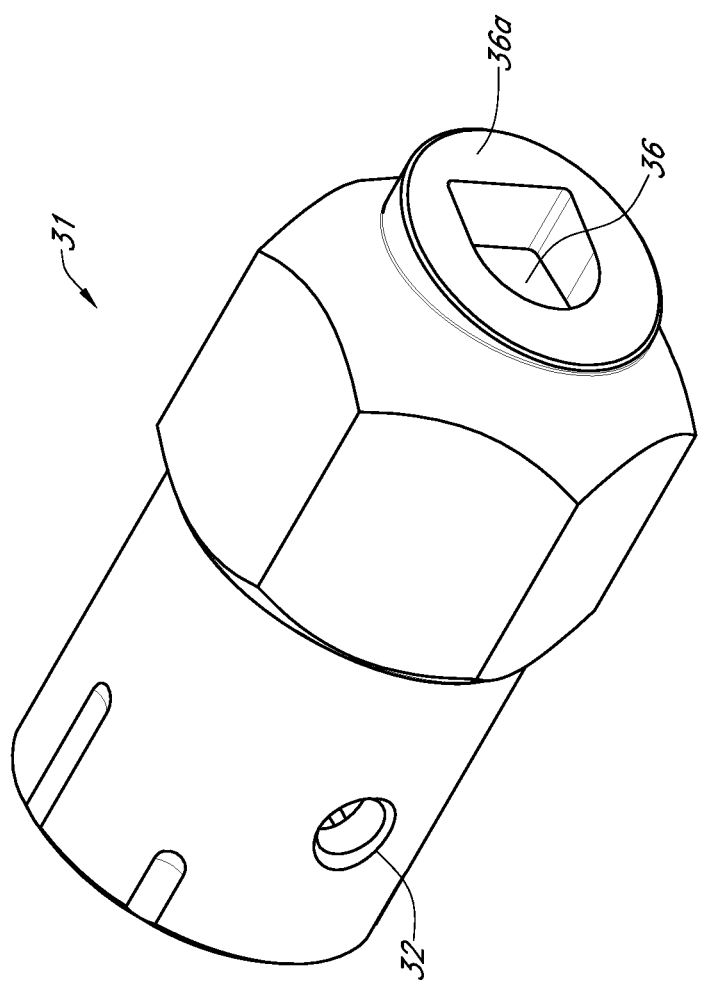
FIG. 6D is a perspective view of the D-Hole with concentric bore positioned in the coupler.

To address and correct this failure to deliver soil 10 (not shown) in a direction 10a (see FIG. 9) to the open furrow/seed slot 9, thus improving soil gathering action, for a closing wheel assembly 20 of the type depicted herein, an assembly for angle adjustment 30 incorporated into the closing wheel assembly 20 is beneficial. As depicted in FIGS. 3-9, an assembly for angle adjustment 30 comprised of a coupler 31 is mounted to the closing wheel shaft 22 of the closing wheel assembly 20. The coupler 31 has a hollow body and is configured with a first end (shaft end 31a) that mounts to the closing wheel shaft 22 by sliding onto and over the closing wheel shaft 22, after removal of the closing wheel 23. (See FIGS. 5A & 5B) A tapped (timed) hole 32 is configured in the body of the coupler 31 proximate the first or shaft end 31a of the coupler and is typically threaded and configured for engagement with a set screw 34. The second end of coupler 31b is configured as a cap having a bore 37 creating a straight passage through the coupler 31 with a special face and end 36a configured therein which applicant has named a "D-hole" 36 as the interior barrel of the D-hole is made up of indexing and non-indexing edges, referenced respectively as, 36b and 36c as illustrated in FIG. 6C. The D-hole 36 and bore 37 are concentric at the cap end and pass straight through the body of the coupler 31. The face (D-hole face) 36a of the cap end may be angled up to 12 degrees as illustrated throughout and particularly by FIG. 6B. Further, the D-hole 36 has an angled face 36a which correspondences to the range of angle allowed by the closing wheel adjustment assembly 30, which as disclosed is 0-12 degrees. Rotating the coupler 31 upon the shaft 22 changes the angle 23a between shaft 22 and closing (rotatable) wheel 23 while maintaining even contact between closing wheel 23 and angled face 36a to support smooth rotation of closing (rotatable) wheel 23. A bolt 33, specially configured for the coupler 31 is configured for insertion in the coupler 31. (See FIGS. 6A and 6B) The angled bolt is comprised of three sections as illustrated throughout but particularly in FIG. 6B. A first section—the shaft (receiver) end 33a is straight and is threaded and is configured for insertion inside to interlock with the mating threads 22a (not shown) inside closing wheel shaft 22 of the prior art. (See FIG. 2) The first section is generally parallel with the body of the coupler 31. An indexing barrel 33c forms the second section and interconnects the first section and the third sections, referenced respectively as, 33a and 33b as illustrated in FIGS. 6A and 6B. The indexing barrel 33c has locking or indexing edges which correspond to the interior shape of the D-hole 36 to index the bolt 33 in the d-hole 36. The third section is the angled end 33b which is also threaded and is angled relative to the first section of the bolt and the indexing barrel 33. The assembly for assembly for angle adjustment 30 comprising coupler 31 and bolt 33 are typically constructed from high quality galvanized steel to inhibit corrosion and increase run life. The above-referenced elements may, however, be constructed of any material known to those skilled in the art or later developed, which material is appropriate for the specific application of the assembly for angle adjustment 30 without departing from the spirit and scope of the present disclosure. One of ordinary skill will also appreciate that the actual mating shape of the D-hole 36 and locking edges (36b, 36c) of the indexing barrel (33c) are inconsequential, i.e. shapes other than a "D" may be chosen without departure from the present disclosure, but that the indexing nature of the design disclosed provides additional benefits in operation and adjustment. One of ordinary skill will also appreciate that although applicant has disclosed the assembly for angle adjustment 30 having two components including coupler 31 and bolt 33, one of ordinary skill will appreciate the end of an axle could be figured as bolt 33 for engagement with coupler 31 to allow for a similar end result and function, rotation to allow for angle introduction and control, without departure from the scope, spirit and intent of the present disclosure.

Illustrative Use and Adjustment

Figure 3:
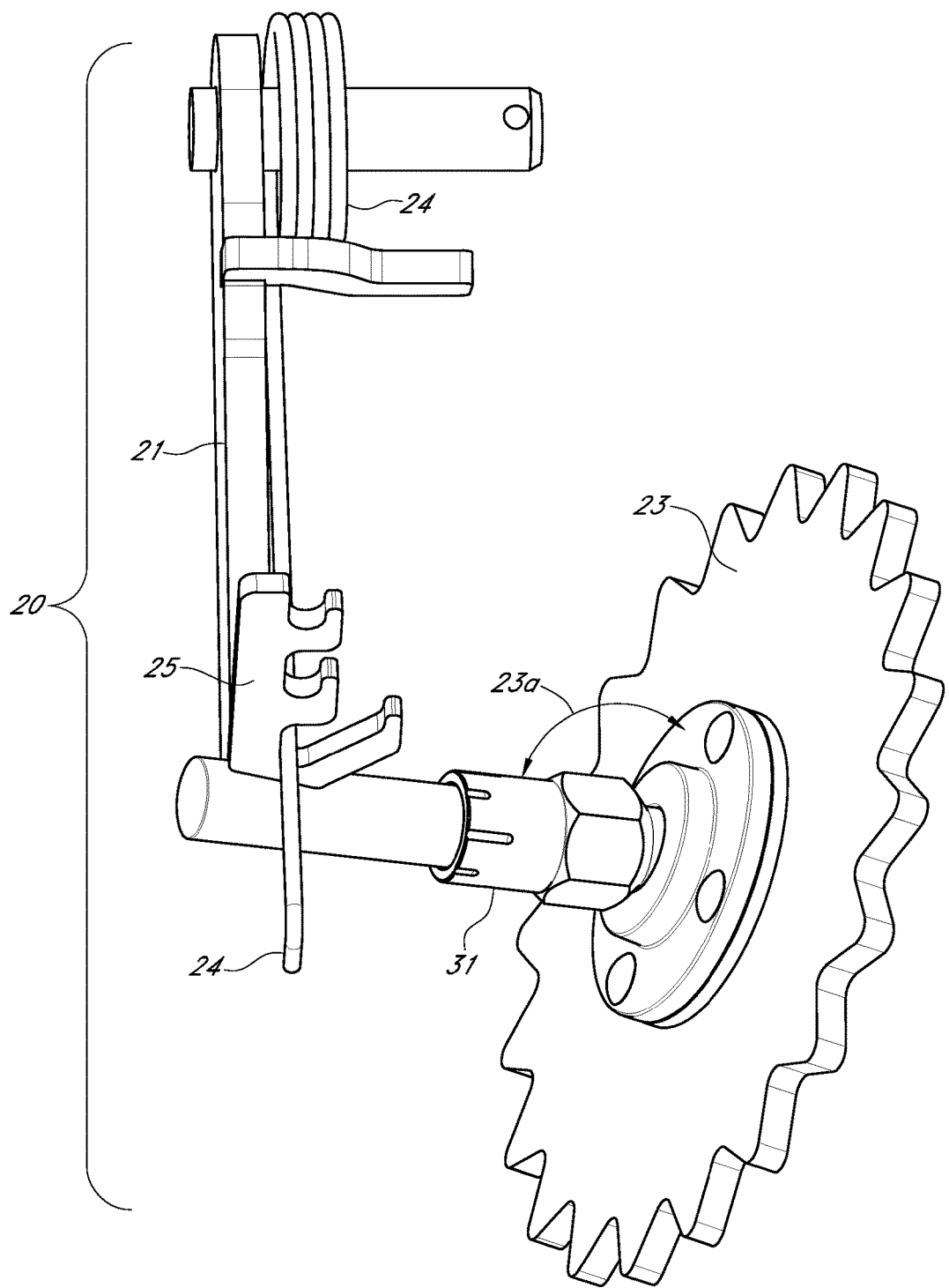
FIG. 3 provides a top view of the closing wheel assemblies as found on the air-seeder of FIG. 1 and shown in detail in FIG. 2 with the addition of the assembly for angle adjustment with a spiked tooth closing wheel mounted therein as disclosed.
Figure 4:
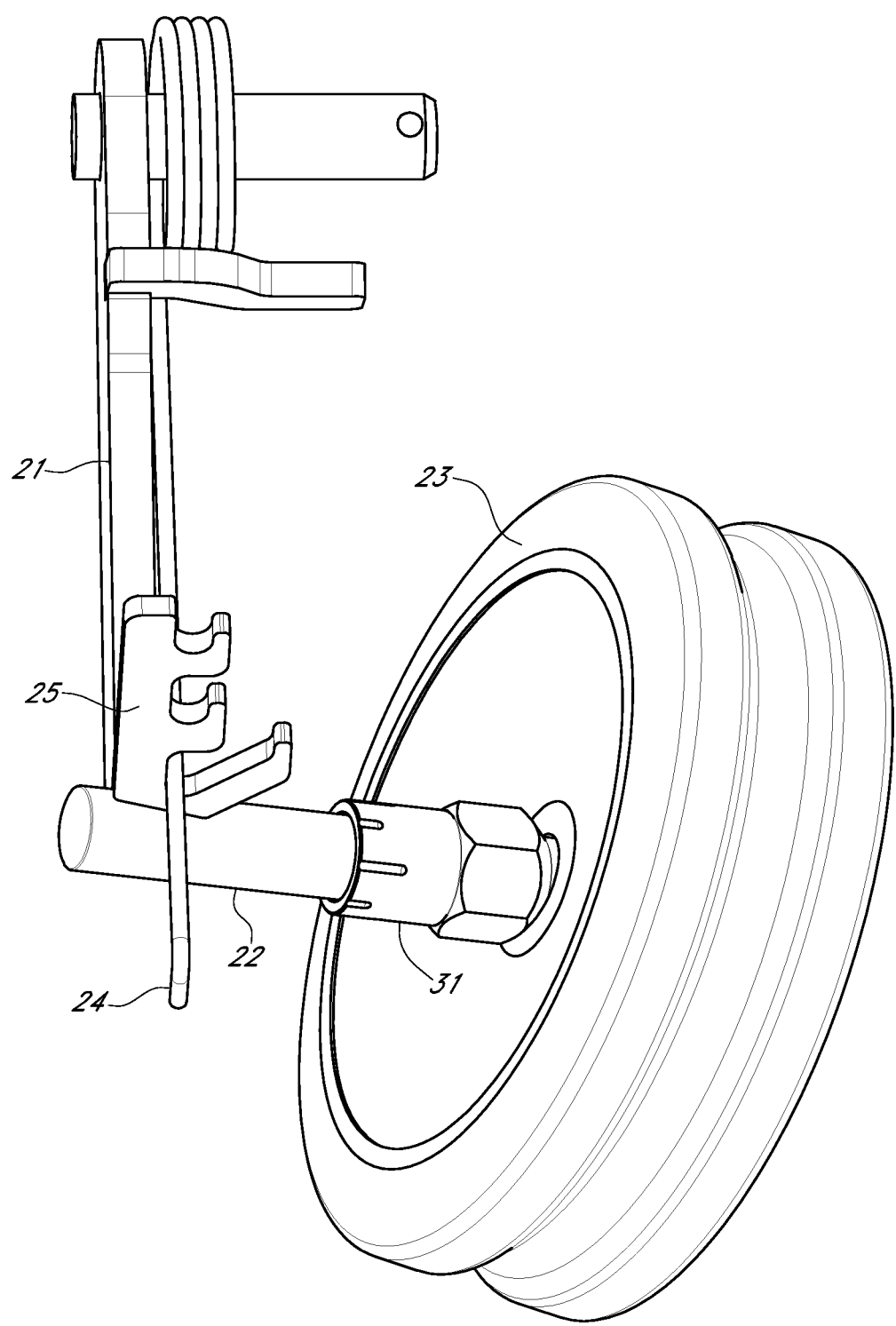
FIG. 4 provides a detailed side view of one embodiment of the assembly for angle adjustment incorporated into a closing wheel assembly wherein a smooth type closing wheel is mounted therein.
Figure 5A:
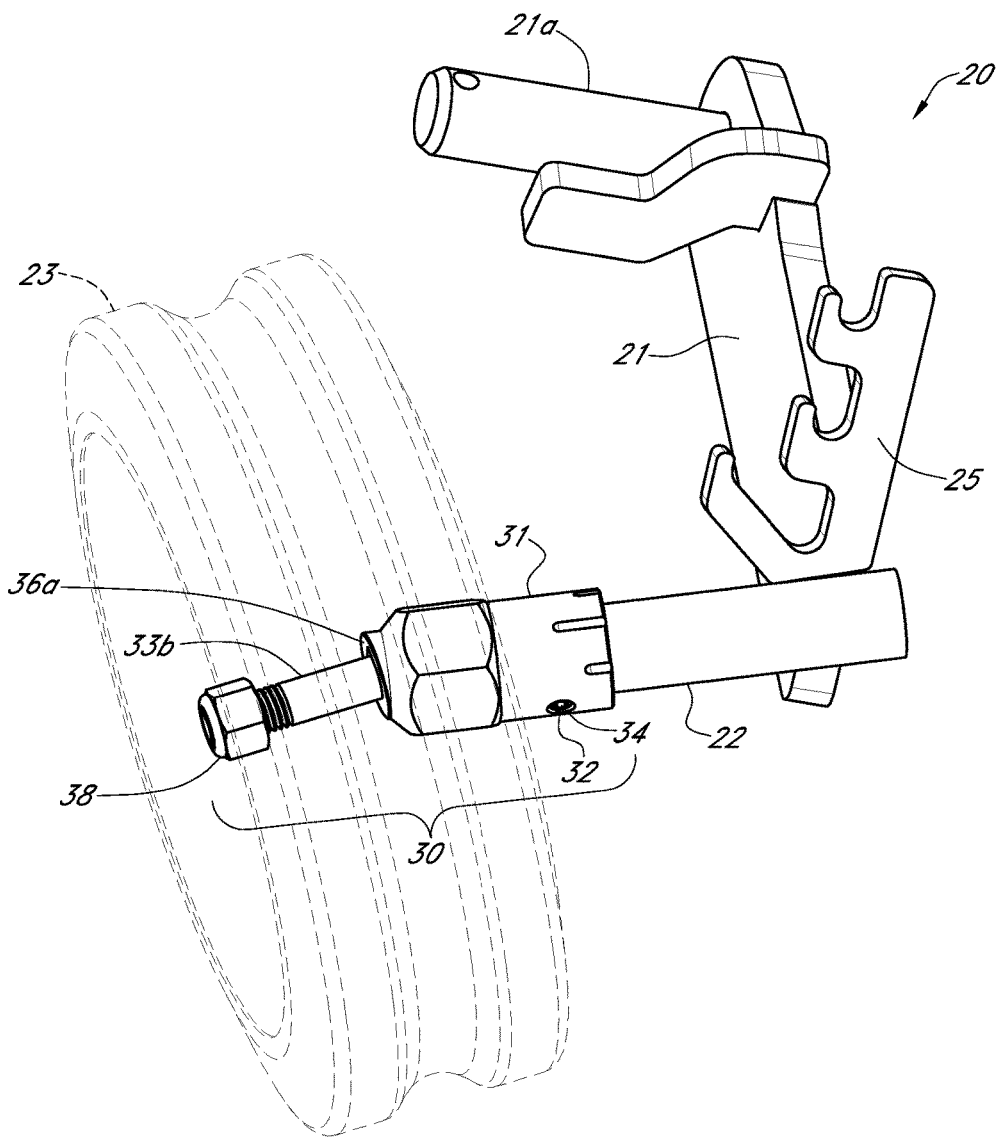
FIGS. 5A and 5B provide several views of the coupler and angled bolt of the assembly for angle adjustment as disclosed with a portion of the closing wheel assembly hidden to better illustrate the features therein.
Figure 5B:
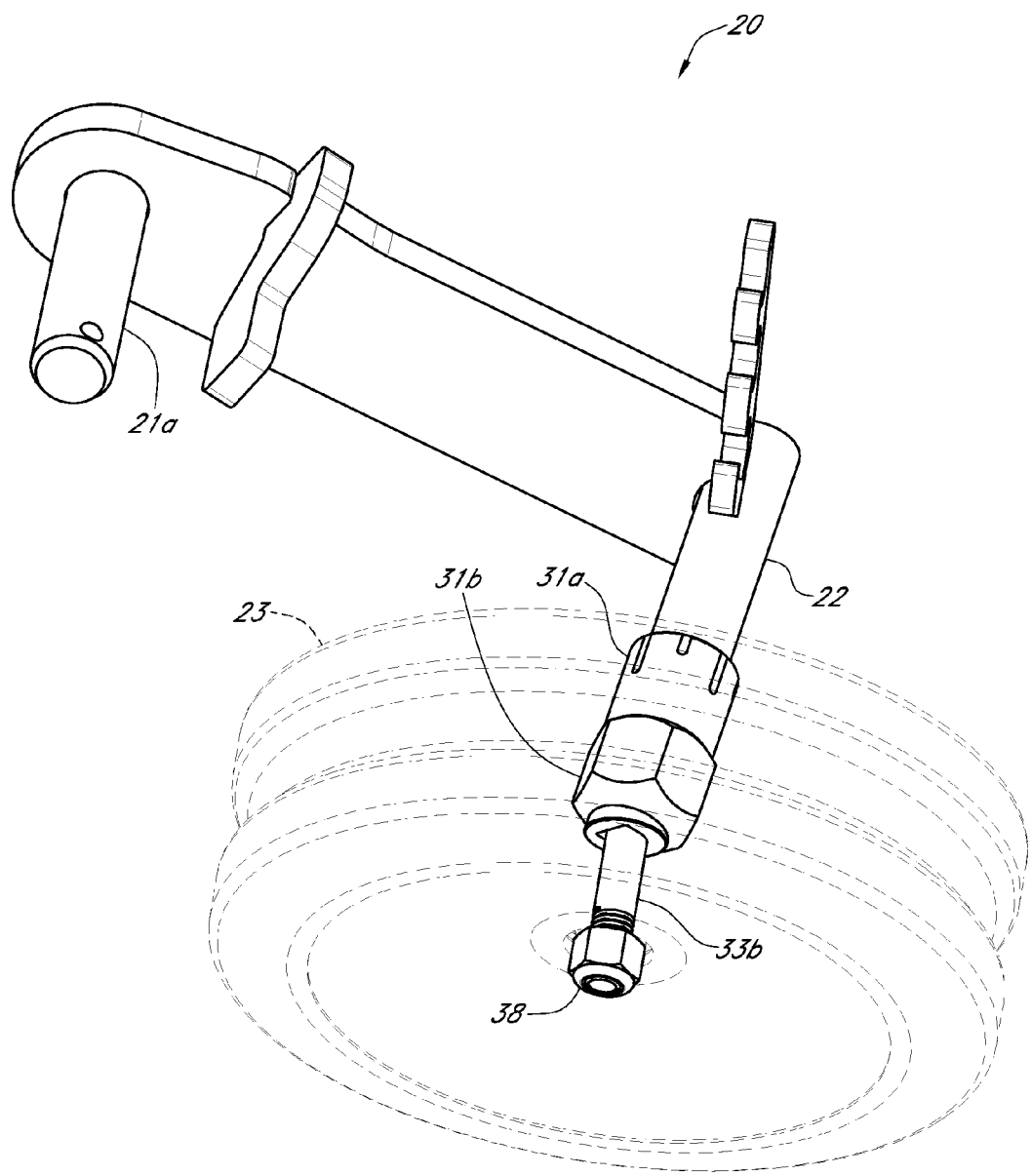
Figure 9:
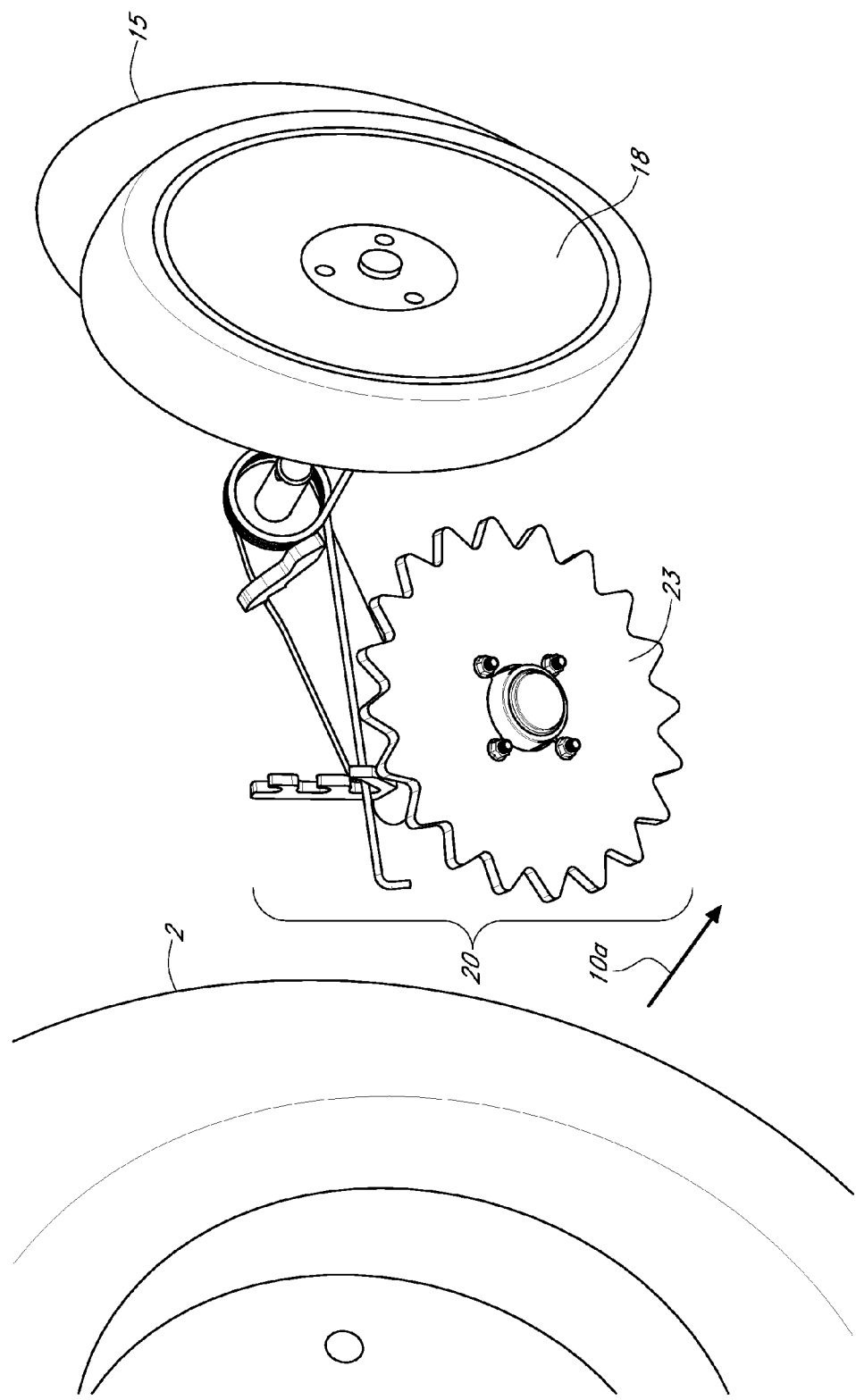
FIG. 9 is a rear view of a right mounted closing wheel assembly with the assembly for angle adjustment of the present disclosure.

Use and operation using the assembly for angle adjustment 30 is illustrated by FIG. 3 and FIG. 9 as incorporated into a closing wheel assembly 20. The opener assembly unit pictured in FIG. 3 is a right-hand (RH) opener, and the timed hole 32 of the coupler 31 is pointing straight backwards (towards the user), assuming the user is positioned posterior of the closing wheel assembly 20 in FIG. 3. For example, and by way of illustration and without limitation, positioning the set-screw 34 straight backwards on a RH opener, as shown, allows the maximum closing wheel adjustment angle of 12 degrees. Further, if the coupler 31 is rotated further so the set-screw 34 is now pointed straight downwards (for a RH opener) the closing wheel angle 23a is now neutral. Finally, if the coupler 31 is rotated further (so the set-screw 34 is pointing straight forward (or away from the user), on a RH opener), the closing wheel angle 23a becomes negative at the maximum angle (not desired as it doesn't gather the soil to close the open furrow 9.

FIG. 9 is a rear view of a right mounted closing wheel assembly with the assembly for angle adjustment 30 of the present disclosure incorporated therein. The closing wheel 23 is adjusted to approximately to an angle 23a having a value of 10.4 degrees and soil 10 (not shown) is moving right to left (soil direction 10a) for a right handed (RH) opener towards the furrow 9 (not shown) to be closed. (See FIG. 1 for illustrative example of an open furrow 9) When the coupler 31 is installed on the closing wheel shaft 22, the assembly for angle adjustment 30 is infinitely adjustable allowing an angle 23a operating range of −12 and +12 degrees to the open furrow 9 (aka seed slot) (when viewed from above, with the closing wheel arm 21 in the horizontal position). One of ordinary skill will appreciate that a closing wheel 23 positioned with a negative angle 23a typically is not desirable as the closing wheel 23 does not gather sufficient soil to close the open furrow 9 so the operating range for a closing wheel angle 23a is 0-12 degrees. Applicant has found that 12 degrees of closing wheel angle 23a is best suited for higher moisture clay soils, especially with no-till conditions. The maximum 12 degree angle is achieved when the set screw 34 is positioned straight backwards on a closing wheel arm 22 that's horizontal when viewed from the side. As the coupler is rotated downwards, the closing wheel angle 23a is reduced. The reduced angle is better suited for looser soils, drier soils or when operating at higher speeds where increased soil throw is common. When the coupler 31 is adjusted so the set screw 34 points straight downwards, the closing wheel 23 will run parallel to the open furrow 9 with little to no closing wheel action which is typically undesirable for this particular application.

After setting the desired closing wheel angle 23a, the lock nut on the axle and the set screw 34 on the coupler 31 are both tightened to lock the coupler 31 in position. The opener assembly unit pictured in FIG. 3 is a right-hand (RH) opener, and the set screw 34 is pointing straight backwards (towards the user). The settings are the same with the left-handed (LH) opener as the coupler 31 is reversed on the opposite side. Indicator marks 35 are provided on the coupler 31 to ensure all couplers 31 are positioned at a consistent angle within all of the closing wheel arm shafts 22 across the drill/planter/seeder 1.

Figure 7:
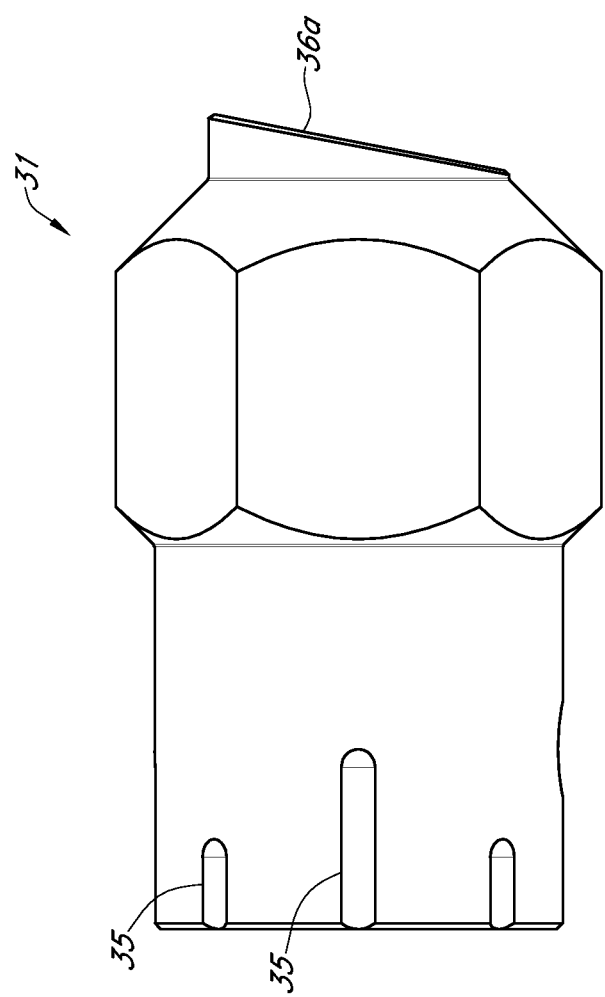
FIG. 7 is a perspective view of another embodiment of the assembly for angle adjustment applied to a closing wheel assembly wherein indicator marks have been positioned around the outer circumference of the body of the coupler.

FIG. 7 is a perspective view of another embodiment of the assembly for angle adjustment 30 wherein indicator marks 35 have been positioned around the outer circumference of the body of the coupler 31. One of ordinary skill will appreciate that the assembly for angle adjustment 30 may be configured for use and operation adjacent a plurality of closing wheel assemblies 20 attached to a plurality of corresponding planter row units 10 attached to a tool bar 4 to form a contiguous planter unit (not shown). Furthermore, the assembly for angle adjustment 30 may be adapted for use with non-symmetrical closing wheels (not shown), or walking style closing wheels (not shown), or multiple point closing wheels (shown), independent of the styles or types of closing wheels shown or disclosed herein.

Figure 8:
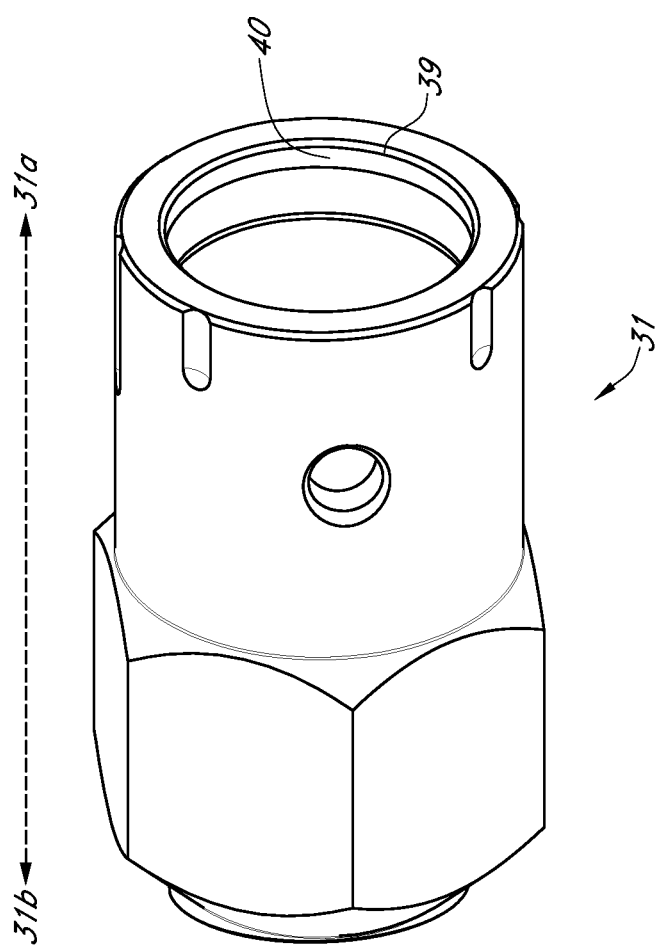
FIG. 8 is a perspective view of another embodiment of the assembly for angle adjustment wherein an annular groove has been positioned in the interior of the shaft end with a rubber seal positioned therein.

FIG. 8 is a perspective view of another embodiment of the assembly for angle adjustment 30 wherein an annular groove 39 has been positioned in the interior of the coupler (shaft end 31a) with a rubber o-ring 40 positioned therein to inhibit intrusion of soil, dirt, water and dust between the coupler shaft end 31a and shaft 22.

Having described the preferred embodiments, other features of the will undoubtedly occur to those versed in the art, as will numerous modifications and alterations in the embodiments as illustrated herein, all of which may be achieved without departing from the spirit and scope of the assembly for angle adjustment 30 disclosed herein. Accordingly, the methods and embodiments pictured and described herein are for illustrative purposes only, and the scope of the present disclosure extends to all method and/or structures for providing increased functionality, comfort, and/or longevity to shoes and/or components thereof. Furthermore, the methods and embodiments pictured and described herein are no way limiting to the scope of the assembly for angle adjustment 30 unless so stated in the following claims.

It should be noted that the assembly for angle adjustment 30 is not limited to the specific embodiments pictured and described herein, but is intended to apply to all similar apparatuses and methods for providing the various benefits and/or features of a assembly for angle adjustment 30. Modifications and alterations from the described embodiments will occur to those skilled in the art without departure from the spirit and scope of the assembly for angle adjustment 30. It is understood that the assembly for angle adjustment 30 as disclosed herein extends to all alternative combinations of one or more of the individual features mentioned, evident from the text and/or drawings, and/or inherently disclosed. All of these different combinations constitute various alternative aspects of the assembly for angle adjustment 30 and/or components thereof. The embodiments described herein explain the best modes known for practicing the assembly for angle adjustment 30 and/or components thereof and will enable others skilled in the art to utilize the same. The claims are to be construed to include alternative embodiments to the extent permitted by the prior art.

While the assembly for angle adjustment 30 has been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as illustrative only, with a true scope and spirit being indicated by the following claims.

The invention claimed is:

1. An assembly for angle adjustment comprising:
   a. a coupler comprising:
      i. a first end having a generally cylindrical shape, wherein said first end is configured to engage said coupler with a generally cylindrical shaft via insertion of said generally cylindrical shaft into said first end;
      ii. a second end connected to said first end, wherein said second end is formed with a cavity along a generally longitudinal axis of said second end, wherein said second end is formed with an aperture in an axial face of said second end, wherein said aperture includes an indexing edge, and wherein said axial face is angled with respect to a longitudinal axis of said first end by 102 degrees;
   b. a bolt positioning within said coupler, said bolt comprising:
      i. a first end configured to engage said generally cylindrical shaft;
      ii. an indexing barrel connected to said first end, wherein said indexing barrel is formed with an indexing edge, wherein said indexing edge prevents relative rotation between said bolt and said coupler when said indexing edge of said bolt is engaged with said indexing edge in said aperture in said second end of said coupler; and,
      iii. an angled end connected to said indexing barrel, wherein a longitudinal axis of said angled end is angled with respect to a longitudinal axis of said first end by 12 degrees, and wherein said angled end is configured to engage a wheel such that said wheel may rotate with respect to said bolt.

2. The assembly for angle adjustment according to claim 1 wherein said aperture in said second end of said coupler is further defined as having a D-shape.

3. The assembly for angle adjustment according to claim 2 wherein said indexing barrel of said bolt is further defined as having a D-shape complimentary to said D-shape in said second end of said coupler.

4. The assembly for angle adjustment according to claim 1 wherein said coupler further comprises a timing hole, wherein said timing hole is generally perpendicular to said longitudinal axis of said coupler.

5. The assembly for angle adjustment according to claim 1 wherein said first end of said coupler further comprises an indicator mark formed on an exterior surface of said first end of said coupler.

6. The assembly for angle adjustment according to claim 1 wherein said assembly allows for adjustment of an angle of said wheel with respect to vertical by an amount of 0-12 degrees.

7. The assembly for angle adjustment according to claim 1 wherein said assembly allows for adjustment of an angle of said wheel with respect to a direction of travel of said wheel by an amount of 0-12 degrees.

8. The assembly for angle adjustment according to claim 1 wherein said wheel is further defined as a closing wheel engaged with a planter row unit.

9. The assembly for angle adjustment according to claim 1 wherein said axial face of said second end of said coupler is further defined as being perpendicular to said longitudinal axis of said angled end of said bolt.

10. A row unit closing wheel assembly comprising:
    a. a closing wheel arm having a first end and a second end, wherein said first end is engaged with a row unit;
    b. a torsion spring rack connected to said closing wheel arm adjacent said second end thereof;
    c. a closing wheel shaft connected to said closing wheel arm adjacent said second end thereof, wherein said closing wheel arm extends outward from said second end;
    d. a torsion spring having a coil and an arm, wherein said coil is engaged with said row unit adjacent said first end of said closing wheel arm, and wherein said arm extends from said coil and engages said rack, wherein said coil biases said closing wheel arm in a generally downward direction;
    e. a coupler engaged with said closing wheel shaft, said coupler comprising:
       i. a first end having a generally cylindrical shape, wherein said first end is configured to engage said coupler with closing wheel shaft via insertion of said closing wheel shaft into said first end;
       ii. a second end connected to said first end, wherein said second end is formed with a cavity along a generally longitudinal axis of said second end, wherein said second end is formed with an aperture in an axial face of said second end, wherein said aperture includes an indexing edge, and wherein said axial face is angled with respect to a longitudinal axis of said first end by 102 degrees;
    f. a bolt positioned within said coupler, said bolt comprising:
       i. a first end configured to engage said closing wheel shaft;
       ii. an indexing barrel connected to said first end, wherein said indexing barrel is formed with an indexing edge, wherein said indexing edge prevents relative rotation between said bolt and said coupler when said indexing edge of said bolt is engaged with said indexing edge in said aperture in said second end of said coupler; and,
       iii. an angled end connected to said indexing barrel, wherein a longitudinal axis of said angled end is angled with respect to a longitudinal axis of said first end by 12 degrees, and wherein said angled end is configured to engage a closing wheel such that said closing wheel may rotate with respect to said bolt.

11. The closing wheel assembly according to claim 10 wherein said aperture in said second end of said coupler is further defined as having a D-shape.

12. The closing wheel assembly according to claim 11 wherein said indexing barrel of said bolt is further defined as having a D-shape complimentary to said D-shape in said second end of said coupler.

13. The closing wheel assembly according to claim 10 wherein said coupler further comprises a timing hole, wherein said timing hole is generally perpendicular to said longitudinal axis of said coupler.

14. The closing wheel assembly according to claim 10 wherein said first end of said coupler further comprises an indicator mark formed on an exterior surface of said first end of said coupler.

15. The closing wheel assembly according to claim 10 wherein said assembly allows for adjustment of an angle of said closing wheel with respect to vertical by an amount of 0-12 degrees.

16. The closing wheel assembly according to claim 10 wherein said assembly allows for adjustment of an angle of said closing wheel with respect to a direction of travel of said row unit by an amount of 0-12 degrees.

17. The assembly for angle adjustment according to claim 10 wherein said axial face of said second end of said coupler is further defined as being perpendicular to said longitudinal axis of said angled end of said bolt.

18. A method of controlling soil delivered to a furrow, said method comprising:
   a. positioning a closing wheel adjacent said furrow;
   b. providing a motive force to said closing wheel, wherein said motive force generally follows a line of said furrow;
   c. providing an assembly for angle adjustment, wherein said closing wheel is engaged with said assembly for angle adjustment, and wherein said assembly for angle adjustment comprises:
     i. a coupler comprising:
       1. a first end having a generally cylindrical shape, wherein said first end is configured to engage said coupler with a generally cylindrical shaft via insertion of said generally cylindrical shaft into said first end;
       2. a second end connected to said first end, wherein said second end is formed with a cavity along a generally longitudinal axis of said second end, wherein said second end is formed with an aperture in an axial face of said second end, wherein said aperture includes an indexing edge, and wherein said axial face is angled with respect to a longitudinal axis of said first end by 102 degrees;
     ii. a bolt positioning within said coupler, said bolt comprising:
       1. a first end configured to engage said generally cylindrical shaft;
       2. an indexing barrel connected to said first end, wherein said indexing barrel is formed with an indexing edge, wherein said indexing edge prevents relative rotation between said bolt and said coupler when said indexing edge of said bolt is engaged with said indexing edge in said aperture in said second end of said coupler; and,
       3. an angled end connected to said indexing barrel, wherein a longitudinal axis of said angled end is angled with respect to a longitudinal axis of said first end by 12 degrees, and wherein said angled end is configured to engage said closing wheel such that said closing wheel may rotate with respect to said bolt;
   d. rotating said coupler on said generally cylindrical shaft, whereby rotation of said coupler causes a change in an angle of said closing wheel, and whereby said change in said angle of said closing wheel controls soil delivered to said furrow.

19. The method of controlling soil delivered to a furrow according to claim 18 wherein said angle is further defined as an angle with respect to vertical.

20. The method of controlling soil delivered to a furrow according to claim 18 wherein said angle is further defined as an angle with respect to said motive force.

* * * * *